Jan. 17, 1928.  
J. D. MERRIFIELD  
1,656,597  
TAP FOR FORMING SCREW THREAD CUTTING DIES  
Filed Feb. 23, 1923  2 Sheets-Sheet 1
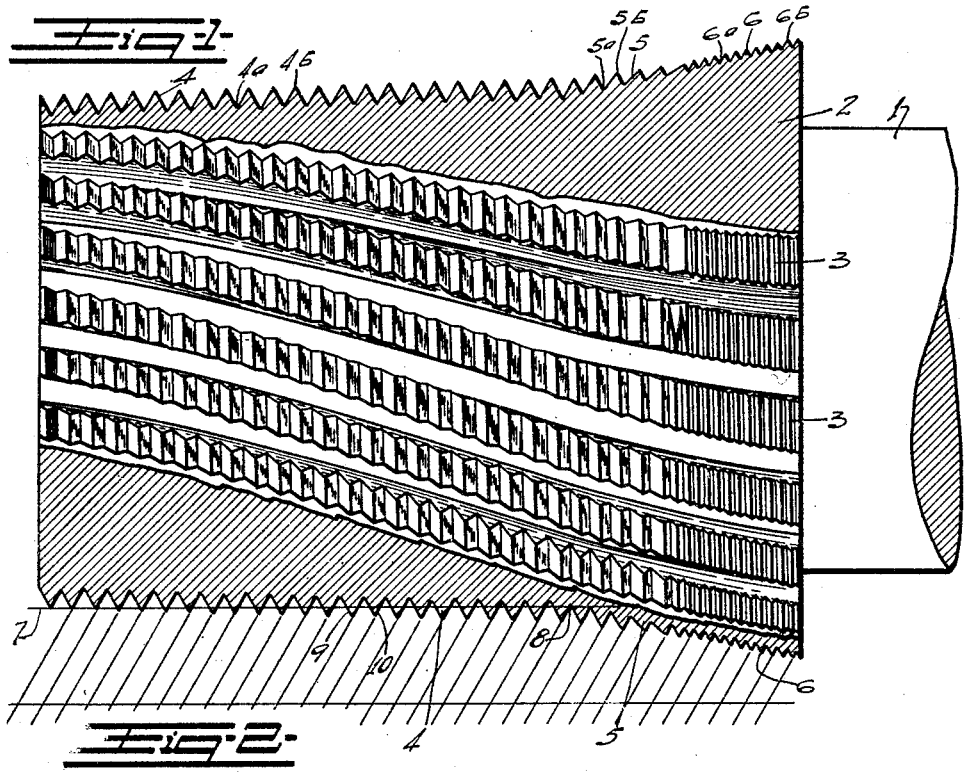
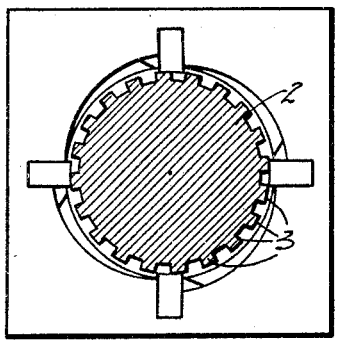
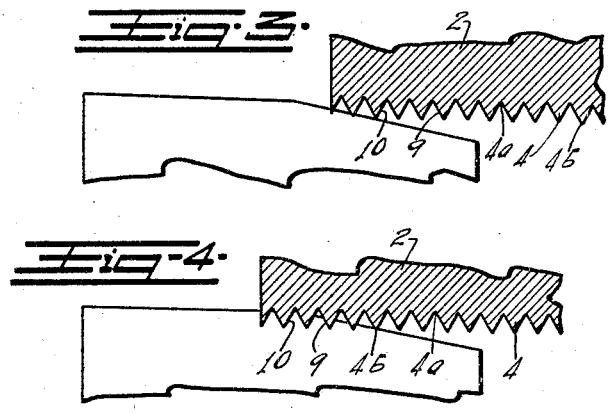
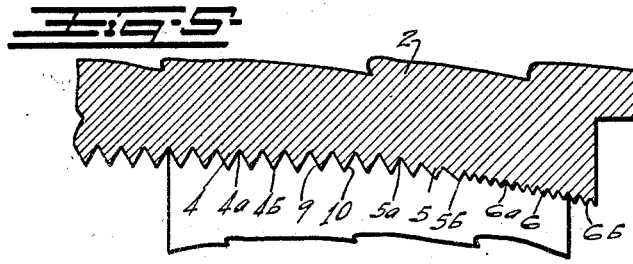
Inventor  
John D. Merrifield  
Attorney Jan. 17, 1928.　　　　　　　　　　　　　　　　　　1,656,597
J. D. MERRIFIELD
TAP FOR FORMING SCREW THREAD CUTTING DIES
Filed Feb. 23, 1923　　　2 Sheets-Sheet 2
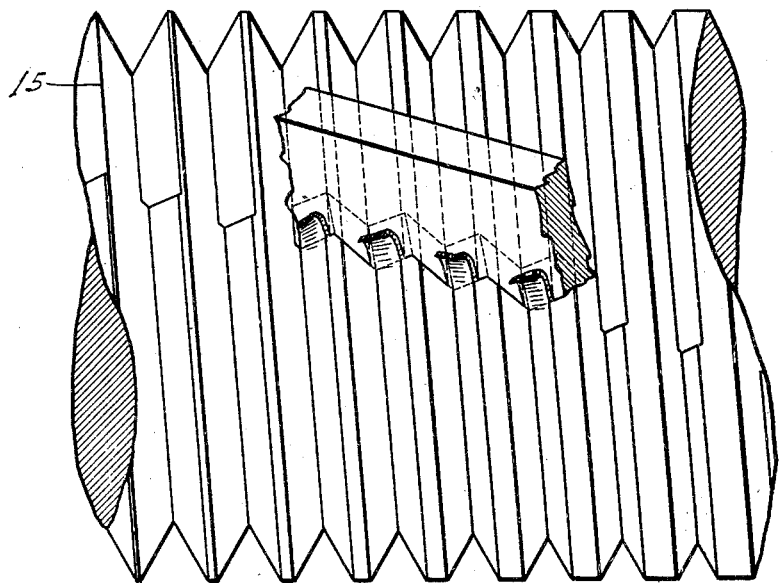
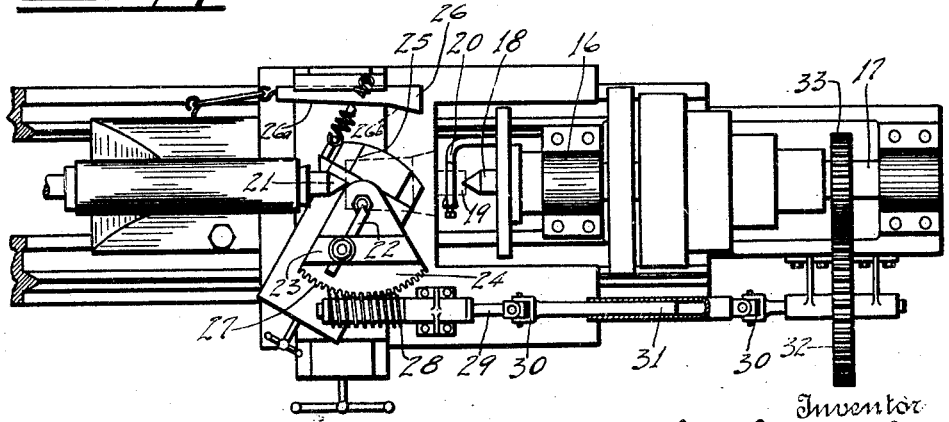
Inventor
John D. Merrifield
Attorney Patented Jan. 17, 1928.

1,656,597

UNITED STATES PATENT OFFICE.

JOHN D. MERRIFIELD, OF ERIE, PENNSYLVANIA, ASSIGNOR TO REED MANUFACTURING COMPANY, OF ERIE, PENNSYLVANIA, A CORPORATION OF PENNSYLVANIA.

TAP FOR FORMING SCREW-THREAD-CUTTING DIES.

Application filed February 23, 1923. Serial No. 620,648.

This invention is designed to simplify the forming of screw thread cutting dies—in the preferred form dies which are designed to cut threads by advancing the cut along one slope of the threads. According to my invention I am able to form such dies with the completed throat by the use of a cutting tool specially designed for the purpose.

The invention is illustrated in the accompanying drawings wherein the tap is exemplified and the means of forming the tap are illustrated as follows:—

Fig. 1 shows a side elevation partly in section of the tap.

Fig. 2 a cross section of the tap cutting the threads of a die.

Fig. 3 a longitudinal section of a portion of the tap in its initial position on a chaser.

Fig. 4 the same view with the tap slightly advanced.

Fig. 5 the tap advanced to the finished cut.

Fig. 6 a plan view showing the finished chaser in position on a thread being cut.

Fig. 7 a plan view of the machine showing the method of forming the tap.

1 marks the tap shank, 2 the tap proper, and 3 the lands formed in the tap. The tap is provided with teeth 4 for cutting the finishing teeth in the body of the die, the teeth 4 being provided with troughs 4ª and crests 4ᵇ. The tap has also the teeth 5 for cutting the starting teeth of the die in the throat of the die and the teeth 5 have troughs 5ª and crests 5ᵇ. The tap has also teeth 6 for cutting the entrance teeth of the die in the outer throat of the die and the teeth have the troughs 6ª and crests 6ᵇ.

Where the cut is along one slope the spiral of the thread, or what might be termed the master spiral, or lead follows along one slope of the teeth and thus is indicated in the drawings by the intersections of the line 7 with the slopes of the teeth. The master spiral marks the crest of the final finished thread which is cut by the die formed by this tap. It is the geometric line controlling the lay-out of the thread. The master spiral leads into the trough in this instance where the tapers of the tap shift at 8. Preferably the tap is arranged to form a chaser, or die, with a throat having a different taper from the taper of the die. This taper changes at the point 8 and the starting cutters 5 are as shown arranged in the throat.

The cutting teeth have what is termed the front slope 9, this being the slope in front of the crests and rear slope 10.

By forming the flutes in spiral relation the cutting edge is given a more acute angle. This is possible where the entire cut is done along one slope because the negative rake at the opposite slope does not affect the cutting.

In cutting the die thread I prefer to lead it a few thousandths faster or slower depending on which slope is being cut than the spiral of the final thread on the final work which is cut by the die. The finished die, therefore, has its threads or teeth at a slightly greater inclination than the finished thread on the final work being cut, the finished thread 15 being shown in Fig. 6. This is possible where the tool cuts on one slope and the effect on the finished die is to give it a slight relief or clearance in an axial direction back of the cutting edge of the die and to crowd the cutting edge forward by contact of the heel of the teeth on the opposite slope. The amount of this variation may be made to correct the lag in lead and where the die itself is depended upon in feeding the die forward on the work in order to put this slight inclination in the die the tap which forms the die has a tooth inclination slightly in advance of the final pitch of the thread which is formed by the die on the final work cut by the die. The die in turn is cut by the tap having a similar characteristic. In other words, an inclination of the master spiral above referred to which follows along the slope of the teeth varies slightly from the spiral of the final thread.

The method of forming the tap itself is not the subject matter of this invention but is described in order that the tap itself may be better understood. A convenient machine for this purpose is shown in Fig. 7. This machine has a head 16 in which is journaled a spindle 17 with a centering device 18 engaging an extension 19 on the tap. The tap is locked with the spindle by the usual dog 20. A tail-centering piece 21 is shown as operating on the tap.

A cutting tool 22 is mounted in a post 23. The post is carried by a rotating platform 24 on the slide 25. The slide is arranged in guides to slide at the angle of the one slope of the tooth, this being the slope which remains constant in the starting teeth. The slide operates against a cam 26, the cam 26 having the cam surfaces 26ª and 26ᵇ conforming to the tapers on the tap, it being understood that if it is desired to vary the tapers on the throat that this cam will conform to it.

Any desirable feed forward of the cutting tool 22 may be provided. With this method of control the direction of slide of the cutting tool justifies, or corrects the cut along the taper. It has been common to feed a tool at the direction of the inclination but the taper heretofore has followed a right angle to the axis and consequently machines of this type have not corrected for the taper where the cut is as shown by applicant.

In order to shift the inclination of the starting teeth the tool for the main cut as made is set to rotate on the cutting point of the tool, in other words, the platform 24 has its axis coincident with the point of the cutting tool. A worm gear 27 is arranged on the periphery of the platform 24 and meshes with a worm 28. The worm 28 is mounted on a shaft 29. The shaft 29 is provided with universals 30 and the slip joint 31. A gear 32 is arranged on the end of the shaft and meshes with a drive gear 33 of the lathe.

It will be understood that the chasers are arranged in cutting relation as the tap is advanced into them. In Fig. 2 I have shown the chasers arranged in a solid die. This is held in the ordinary machine, the tap advanced with a lead screw following the master spiral which I have before described and the tap is advanced into the chasers to the position forming the proper throat, this position being indicated in Fig. 5.

It will be noted that at the juncture between the entrance threads 6 and the starting threads 5 in order to obviate an excess cut of the initial thread 5 this thread should be eased off from flute to flute through a part of a revolution of the tap.

What I claim as new is:—

1. A tap for forming screw thread cutting dies having a plurality of tapers, one taper being designed to form the teeth in the body of the die and one taper to form the teeth in the throat of the die, said tap having its cutting teeth forming the throat of the die with one slope having an inclination varying from the slope of the teeth on the tap preceding them.

2. A tap for forming screw thread cutting dies having its teeth spaced and inclined to form their cut from one slope of the die, said tap having a plurality of tapers, one taper being designed to form the teeth in the body of the die and one taper to form the teeth in the throat of the die, said tap having is cutting edge forming the throat of the die with one slope having an inclination varying from the slope of the teeth on the tap preceding them.

3. A tap for forming screw thread cutting dies having its teeth spaced and inclined to form their cut from one slope of the die, said tap having a plurality of tapers, one taper being designed to form the teeth in the body of the die and one taper to form the teeth in the throat of the die, said tap having its cutting edge forming the throat of the die having one slope with an inclination varying from the slope of the preceding teeth, the troughs of said cutting teeth in the taper forming the throat being regularly spaced with relation to the troughs of the preceding teeth.

4. A tap for forming screw thread cutting dies having a plurality of tapers, one taper forming the threads of the body of the die and the other taper the throat of the die, the teeth formed on the part of the tap forming the throat finer than the teeth on the taper forming the body of the die, said finer teeth with their crests closer together and having pointed troughs and the same lead as the teeth forming the body of the die.

5. A tap for forming screw thread cutting dies having a plurality of tapers, one taper cutting the body of the die and the other taper cutting the teeth of the throat of the die, the teeth cutting the throat of the die forming the intermediate teeth with one slope varying in inclination from the slope of the teeth of the body of the die, said intermediate teeth preceding entrance teeth in the throat, said entrance teeth being finer and with crests closer together than the teeth forming the body of the die, said entrance teeth having pointed troughs and the same inclination as the other teeth of the tap.

6. A tap for forming screw thread cutting dies having a plurality of tapers, one taper cutting the body of the die and the other taper having entrance threads finer and with crests closer together than the teeth cutting the body of the die but of the same pitch, the teeth cutting the body of the die being of smaller diameter than the teeth forming the entrance teeth of the die.

In testimony whereof I have hereunto set my hand.

JOHN D. MERRIFIELD.